(12) United States Patent
Nagai

(10) Patent No.: US 12,021,974 B2
(45) Date of Patent: Jun. 25, 2024

(54) TERMINAL, SERVER, METHOD AND PROGRAM

(71) Applicant: NIPPON TELEGRAPH AND TELEPHONE CORPORATION, Tokyo (JP)

(72) Inventor: Akira Nagai, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 280 days.

(21) Appl. No.: 17/764,170

(22) PCT Filed: Oct. 4, 2019

(86) PCT No.: PCT/JP2019/039253
§ 371 (c)(1),
(2) Date: Mar. 26, 2022

(87) PCT Pub. No.: WO2021/064978
PCT Pub. Date: Apr. 8, 2021

(65) Prior Publication Data
US 2022/0337403 A1    Oct. 20, 2022

(51) Int. Cl.
*H04L 9/08*    (2006.01)
*H04L 9/30*    (2006.01)
*H04L 9/40*    (2022.01)

(52) U.S. Cl.
CPC .......... *H04L 9/0825* (2013.01); *H04L 9/0894* (2013.01); *H04L 9/3066* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 2020/0007519 A1* | 1/2020 | Thorpe | .................. H04L 63/166 |
| 2022/0248221 A1* | 8/2022 | Nix | ........................ H04W 12/02 |

FOREIGN PATENT DOCUMENTS

| | | | | |
|---|---|---|---|---|
| EP | 3193486 A1 | * | 7/2017 | ......... H04L 63/0428 |
| KR | 20160140240 A | * | 12/2016 | ........... H04L 1/1887 |
| WO | WO-2018095050 A1 | * | 5/2018 | ............. H04L 29/00 |

OTHER PUBLICATIONS

Sakami et al. (2015) "Proposal of a Mutual Authentication Scheme for IoT Using ID-Based Encryption", SCIS 2015 with English Machine Translation.

(Continued)

*Primary Examiner* — Benjamin E Lanier

(57) ABSTRACT

A terminal for performing authentication through TLS 1.3 with a server connected via a communication network. The terminal includes a memory and a processor configured to execute transmitting, to the server, a ClientHello message including a first identifier and a first short-term public key, which are needed to generate a shared key for encrypting a message during a handshake in the TLS 1.3, through key exchange with mutual authentication using ID-based encryption; receiving, from the server, a ServerHello message including a second identifier and a second short-term public key, which are needed to generate the shared key; and generating the shared key using the first identifier, the first short-term public key, the second identifier, and the second short-term public key.

6 Claims, 7 Drawing Sheets

(56) References Cited

OTHER PUBLICATIONS

"SSL/TLS Encryption Setting Guidelines ~For a Secure Website (Encryption Setting Countermeasure Edition)~", Internet <URL: https://www.ipa.go.jp/security/ipg/documents/ipa-cryptrec-gl-3001-2.0.pdf> with English Machine Translation.
McCullagh et al. (2005) "A New Two-Party Identity-Based Authenticated Key Agreement", CT-RSA 2005, LNCS 3376, pp. 262-274, Springer-Verlag.

* cited by examiner

TERMINAL, SERVER, METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/039253, filed on 4 Oct. 2019, the disclosure of which is hereby incorporated herein by reference in its entirety.

TECHNICAL FIELD

The present invention relates to a terminal, a server, a method, and a program.

BACKGROUND ART

With the spread of IoT (Internet of Things) devices, authentication technology for guaranteeing that devices that communicate with each other are legitimate devices has become important. TLS (Transport Layer Security) 1.2 has conventionally been known as one such authentication technology. TLS 1.3 is also known as a successor to TLS 1.2 and has been used to securely perform communication through HTTP (Hypertext Transfer Protocol), MQTT (Message Queuing Telemetry Transport), and the like.

Incidentally, since IoT devices have limited hardware resources compared to general PCs (Personal Computers) and the like, if TLS is applied to communication with an IoT device, the processing performance for using certificates and the amount of communication becomes an issue. To solve this problem, TLS has been proposed in which key exchange with mutual authentication using ID-based encryption is applied to TLS 1.2 (e.g., NPL 1). The TLS proposed in NPL 1 implements authentication and key exchange using ID-based encryption in the specification of TLS 1.2 without changing the specification of TLS 1.2. Also, the use of ID-based encryption eliminates the need for communication for certificate use.

CITATION LIST

Non Patent Literature

[NPL 1] Y. Sakami, M. Takenaka, A. Kanaoka, "Proposal of a Mutual Authentication Scheme for IoT Using ID-Based Encryption", SCIS 2015.

SUMMARY OF THE INVENTION

Technical Problem

However, since TLS 1.3 has different specifications from TLS 1.2, TLS 1.3 cannot provide ID-based encryption in the same manner as the TLS proposed in NPL 1 above. This is because in the specification of TLS 1.3, after a ClientHello and ServerHello in the handshake are performed, subsequent messages are encrypted, and therefore it is necessary to perform key exchange for encryption in one round.

An embodiment of the present invention has been made in view of the above points, and an object of the present invention is to implement TLS 1.3 to which key exchange with mutual authentication using ID-based encryption is applied.

Means for Solving the Problem

In order to achieve the above-described object, a terminal according to the present embodiment is a terminal for performing authentication through TLS 1.3 with a server connected via a communication network, the terminal including: transmission means for transmitting, to the server, a ClientHello message including a first identifier and a first short-term public key, which are needed to generate a shared key for encrypting a message during a handshake in the TLS 1.3, through key exchange with mutual authentication using ID-based encryption; reception means for receiving, from the server, a ServerHello message including a second identifier and a second short-term public key, which are needed to generate the shared key; and generation means for generating the shared key using the first identifier, the first short-term public key, the second identifier, and the second short-term public key.

Effects of the Invention

It is possible to implement TLS 1.3 to which key exchange with mutual authentication using ID-based encryption is applied.

DESCRIPTION OF EMBODIMENTS

Figure 1:
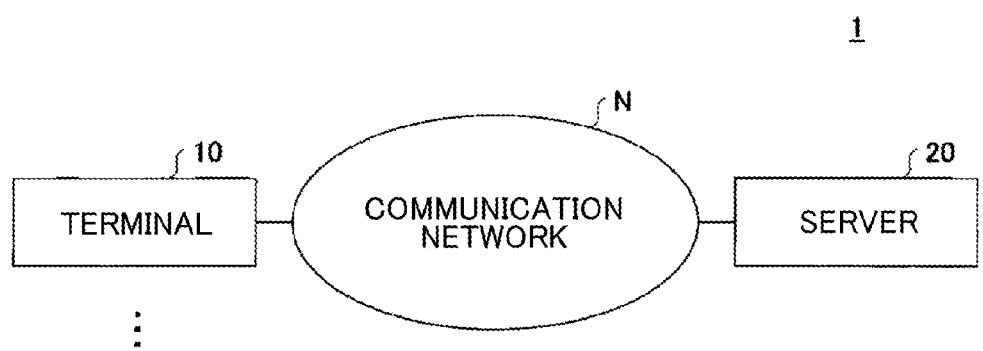
FIG. 1 is a diagram showing an example of an overall configuration of an authentication system according to the present embodiment.

Hereinafter, embodiments of the present invention will be described. In the present embodiment, an authentication system 1 that implements TLS 1.3 to which key exchange with mutual authentication using ID-based encryption is applied will be described.

As mentioned above, the specification of TLS 1.3 is different from that of TLS 1.2. Specifically, as described in Reference Document 1 below, in TLS 1.2, two rounds of communication are performed before the handshake is encrypted, whereas in TLS1.3, only one round of communication (i.e., ClientHello and ServerHello) is performed before the handshake is encrypted.

Reference Document 1

"SSL/TLS Encryption Setting Guidelines ~For a Secure Website (Encryption Setting Countermeasure Edition)~", Internet <URL: https://www.ipa.go.jp/security/ipg/documents/ipa-cryptrec-gl-3001-2.0.pdf>

For this reason, in order to apply key exchange with mutual authentication using ID-based encryption to TLS 1.3, it is necessary to exchange the information needed for key exchange in one round. For example, in a key exchange protocol with mutual authentication using ID-based encryption called an MB scheme, 1.5 rounds are needed to exchange the information needed for key exchange. This is because the MB scheme requires an identifier (ID) of a communication partner in order to generate a short-term public key. Regarding the MB scheme, refer to Reference Document 2 below.

Reference Document 2

N. McCullagh and P. S. L. M. Barreto, "A New Two-Party Identity-Based Authenticated Key Agreement", CT-RSA 2005, LNCS 3376, pp. 262-274, Springer-Verlag, 2005.

Accordingly, in order to implement TLS 1.3 to which key exchange with mutual authentication using ID-based encryption is applied, a key exchange protocol with mutual authentication using ID-based encryption in which the information needed for key exchange can be exchanged in one round, needs to be applied to TLS 1.3.

In view of this, in the authentication system 1 according to the present embodiment, a key exchange protocol with mutual authentication using ID-based encryption in which the information needed for key exchange can be exchanged in one round, is applied to TLS 1.3. As a result, authentication and key exchange using ID-based encryption are performed in the specification of TLS 1.3, and the key obtained through this key exchange can be used to encrypt messages after ClientHello and ServerHello.

Note that even with the above-described MB scheme, for example, if the identifier (ID) of the communication partner is obtained in advance, or the like, it is possible to exchange the information needed for key exchange in one round, but in the present embodiment, it is assumed that the identifier of the communication partner cannot be obtained in advance (i.e., before communication is started). This is because, in many cases, the identifier of the communication partner cannot be obtained in advance, and even if it is obtained, the communication partner does not always use the same identifier.

Overall Configuration

First, an overall configuration of the authentication system 1 according to the present embodiment will be described with reference to FIG. 1. FIG. 1 is a diagram showing an example of the overall configuration of the authentication system 1 according to the present embodiment.

As shown in FIG. 1, the authentication system 1 according to the present embodiment includes one or more terminals 10 and a server 20. Also, the terminals 10 and the server 20 are connected to each other so as to be able to communicate with each other via a communication network N such as the Internet.

The terminals 10 are, for example, various IoT devices such as various sensor devices, embedded devices, wearable devices, digital home appliances, monitoring cameras, lighting devices, medical devices, and industrial devices. That is, it is assumed that the terminals 10 are IoT devices having limited hardware resources (e.g., processor processing performance, memory capacity, communication performance, etc.) compared to a general PC or the like. However, the devices are not limited to these, and the present embodiment can be similarly applied even if the terminal 10 is a device other than an IoT device (e.g., a PC, a smartphone, a tablet terminal, etc.).

The server 20 is, for example, a computer or a computer system that performs data communication with the terminals 10. Examples of the server 20 include a computer that, if the terminal 10 is a sensor device, collects sensing data from the terminal 10.

A case will be described in which key exchange for encryption through a key exchange protocol with mutual authentication using ID-based encryption is performed in the authentication system 1 according to the present embodiment when performing authentication and encrypted communication through TLS 1.3 between the terminal 10 and the server 20. However, this embodiment can be similarly applied to the case where authentication and encrypted communication through TLS 1.3 are performed between different terminals 10.

Note that the configuration of the authentication system 1 shown in FIG. 1 is an example, and other configurations may be adopted. For example, the authentication system 1 may also include a device or system that functions as a key generation center (KGC).

Hardware Configuration

Next, the hardware configuration of the terminal 10 and the server 20 according to this embodiment will be described.

Terminal 10

Figure 2:
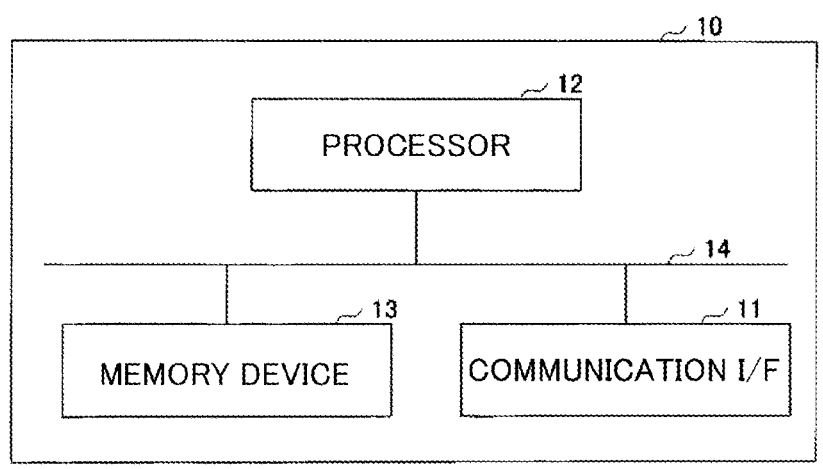
FIG. 2 is a diagram showing an example of a hardware configuration of a terminal according to the present embodiment.

Hereinafter, the hardware configuration of the terminal 10 according to the present embodiment will be described with reference to FIG. 2. FIG. 2 is a diagram showing an example of the hardware configuration of the terminal 10 according to the present embodiment.

As shown in FIG. 2, the terminal 10 according to the present embodiment includes a communication I/F 11, a processor 12, and a memory device 13. Each of these pieces of hardware is communicably connected via a bus 14.

The communication I/F 11 is an interface for connecting the terminal 10 to the communication network N. The terminal 10 can perform data communication with the server 20, other terminals 10, and the like via the communication I/F 11.

The processor 12 is, for example, an MPU (Micro Processing Unit), a CPU (Central Processing Unit), or the like, and is a computation device that reads programs and data from the memory device 13 and executes various types of processing.

The memory device 13 is, for example, a RAM (Random Access Memory), a ROM (Read Only Memory), a flash memory, or the like, and is a storage device for storing various types of data, programs, and the like.

By having the hardware configuration shown in FIG. 2, the terminal 10 according to the present embodiment can implement later-described authentication processing. Note that the hardware configuration shown in FIG. 2 is an example, and the terminal 10 may have another hardware configuration. For example, the terminal 10 may include a plurality of processors 12 and may include a plurality of memory devices 13.

Server 20

Figure 3:
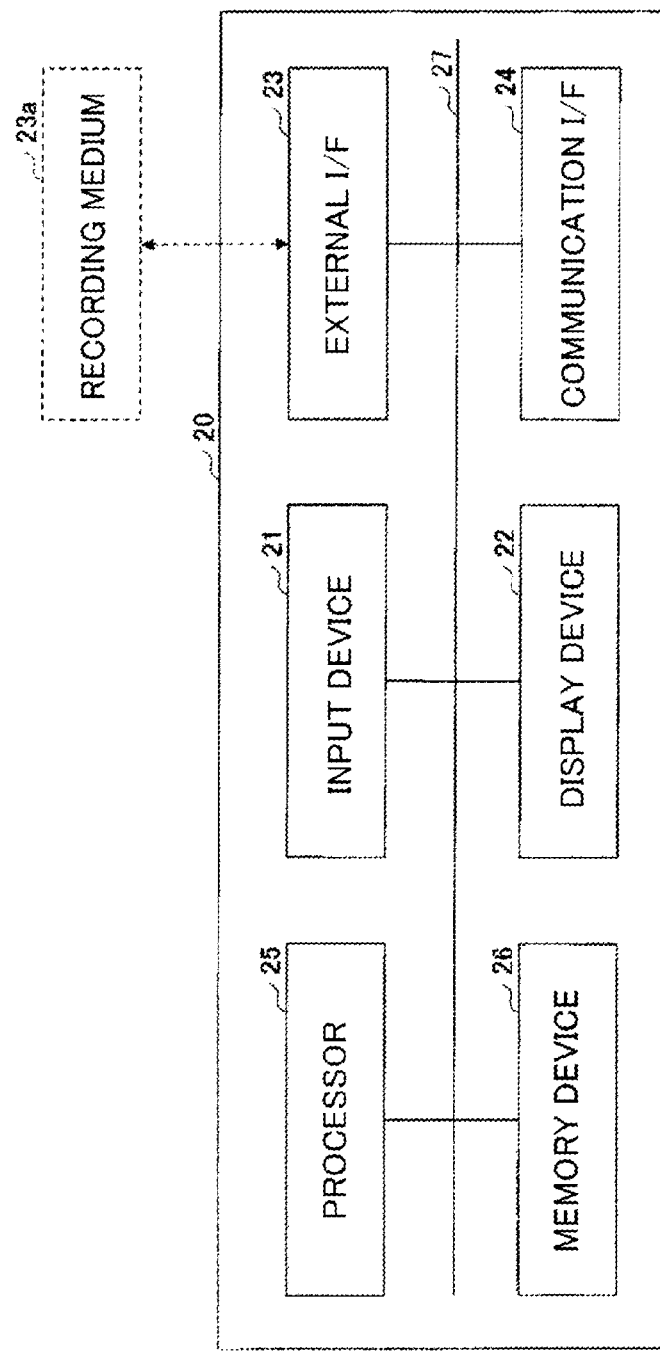
FIG. 3 is a diagram showing an example of a hardware configuration of a server according to the present embodiment.

Hereinafter, the hardware configuration of the server 20 according to the present embodiment will be described with reference to FIG. 3. FIG. 3 is a diagram showing an example of the hardware configuration of the server 20 according to the present embodiment.

As shown in FIG. 3, the server 20 according to the present embodiment includes an input device 21, a display device 22, an external I/F 23, a communication I/F 24, a processor 25, and a memory device 26. These pieces of hardware are connected so as to be able to communicate via the bus 27.

The input device 21 is, for example, a keyboard, a mouse, a touch panel, or the like, and is used to input various operations to the server 20. The display device 22 is, for example, a display or the like, and is used to display various processing results of the server 20 or the like. The server 20 need not include at least one of the input device 21 and the display device 22.

The external I/F 23 is an interface with an external device. The external device includes a recording medium 23a and the like. The server 20 can read and write from and to the recording medium 23a and the like via an external I/F. Note that examples of the recording medium 23a include a CD (Compact Disk), a DVD (Digital Versatile Disk), an SD memory card (Secure Digital memory card), and a USB (Universal Serial Bus) memory card.

The communication I/F 24 is an interface for connecting the server 20 to the communication network N. The server 20 can perform data communication with the terminal 10 and the like via the communication I/F 24.

The processor 25 is, for example, a CPU or the like, and is a computation device that reads programs and data from the memory device 26 and executes various types of processing.

The memory device 26 is, for example, a RAM, a ROM, a flash memory, an HDD (Hard Disk Drive), an SSD (Solid State Drive), or the like, and is a storage device for storing various types of data, programs, and the like.

By having the hardware configuration shown in FIG. 3, the server 20 according to the present embodiment can implement later-described authentication processing. Note that the hardware configuration shown in FIG. 3 is an example, and the server 20 may also have another hardware configuration. For example, the server 20 may also include a plurality of processors 25, and may also include a plurality of memory devices 26.

Functional Configuration

Figure 4:
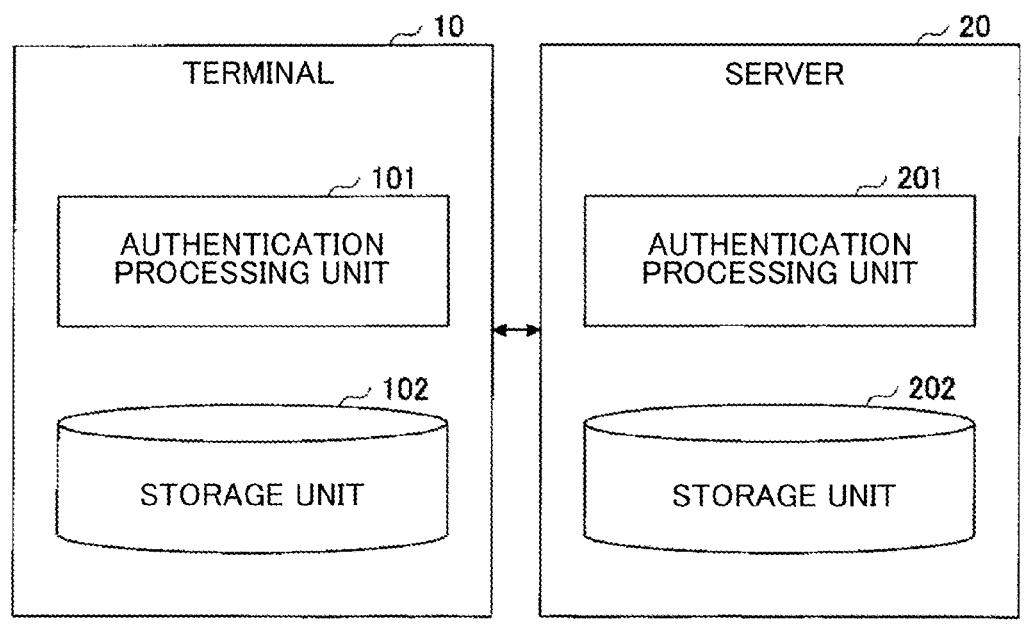
FIG. 4 is a diagram showing an example of a functional configuration of a terminal and a server according to the present embodiment.

Next, a functional configuration of the terminal 10 and the server 20 according to the present embodiment will be described with reference to FIG. 4. FIG. 4 is a diagram showing an example of the functional configuration of the terminal 10 and the server 20 according to the present embodiment.

Terminal 10

As shown in FIG. 4, the terminal 10 according to the present embodiment includes an authentication processing unit 101 and a storage unit 102. The authentication processing unit 101 is implemented through processing for causing the processor 12 to execute one or more programs installed in the terminal 10. Also, the storage unit 102 can be implemented by using, for example, the memory device 13 or the like.

The authentication processing unit 101 performs authentication and encrypted communication through TLS 1.3 with the server 20. At this time, the authentication processing unit 101 performs key exchange for encryption with the server 20 using a key exchange protocol with mutual authentication using ID-based encryption.

The storage unit 102 stores various types of data. Examples of the data stored in the storage unit 102 include the identifier of the terminal 10 and the user private key. Temporary data used when performing authentication and encrypted communication through TLS 1.3 with the server 20 is also stored in the storage unit 102.

Note that any identifier can be used as the identifier of the terminal 10. For example, a user ID, a name, an e-mail address, a telephone number, a manufacturing unique number of the terminal 10, an IP (Internet Protocol) address, a physical address, or the like can be used as the identifier of the terminal 10.

Server 20

As shown in FIG. 4, the server 20 according to the present embodiment has an authentication processing unit 201 and a storage unit 202. The authentication processing unit 201 is implemented through processing for causing the processor 25 to execute one or more programs installed on the server 20. Also, the storage unit 202 can be implemented using, for example, a memory device 26 or the like. Note that the storage unit 202 may also be implemented by using, for example, a storage device connected to the server 20 via the communication network N or the like.

The authentication processing unit 201 performs authentication and encrypted communication through TLS 1.3 with the terminal 10. At this time, the authentication processing unit 201 performs key exchange for encryption with the terminal 10 using a key exchange protocol with mutual authentication using ID-based encryption.

The storage unit 202 stores various types of data. Examples of the data stored in the storage unit 202 include the identifier of the server 20 and the user private key. Temporary data for performing authentication and encrypted communication through TLS 1.3 with the terminal 10 is also stored in the storage unit 202.

Note that any identifier can be used as the identifier of the server 20. For example, a manufacturing unique number, an IP address, a physical address, a website name, an e-mail address, a telephone number, or the like of the server 20 can be used as the identifier of the server 20.

Details of Processing

Next, the details of the processing of the authentication system 1 according to the present embodiment will be described. In this embodiment, Working Examples 1 to 3 of the authentication processing through TLS 1.3 to which key exchange with mutual authentication using ID-based encryption is applied will be described. The security level of Working Examples 1 to 3 is substantially the same, but the calculation efficiency is the best in Working Example 3. Note that in addition to the methods described in Working Examples 1 to 3, a key exchange protocol with mutual authentication using ID-based encryption, in which information needed for key exchange can be exchanged in one round, can be applied to TLS 1.3.

Definition of Symbols

First, symbols used commonly in the following working examples are defined as follows.

$ID_A$: Identifier of terminal 10
$ID_B$: Identifier of server 20
k: Security parameter
p, q: Prime numbers that satisfy p≠q
$G_1$: Subgroup of group $E(F_p)$ on elliptic curve $E_1$, where $E_1$ is an elliptic curve on a finite field $F_p$
$G_2$: Group on elliptic curve $E_2$, where $E_2$ is an elliptic curve on a k-th extension field of a finite field $F_p$
A subgroup of $$E(F_{p^k})$$ [Math. 1]

$g_1$: Generator of $G_1$
$g_2$: Generator of $G_2$
e: Pairing defined on $G_1 \times G_2$
$Z_q$: Coset modulo q
||: Concatenation of character strings
H: Key derivation function
K: Shared key Authentication Processing (Working Example 1)

Figure 5:
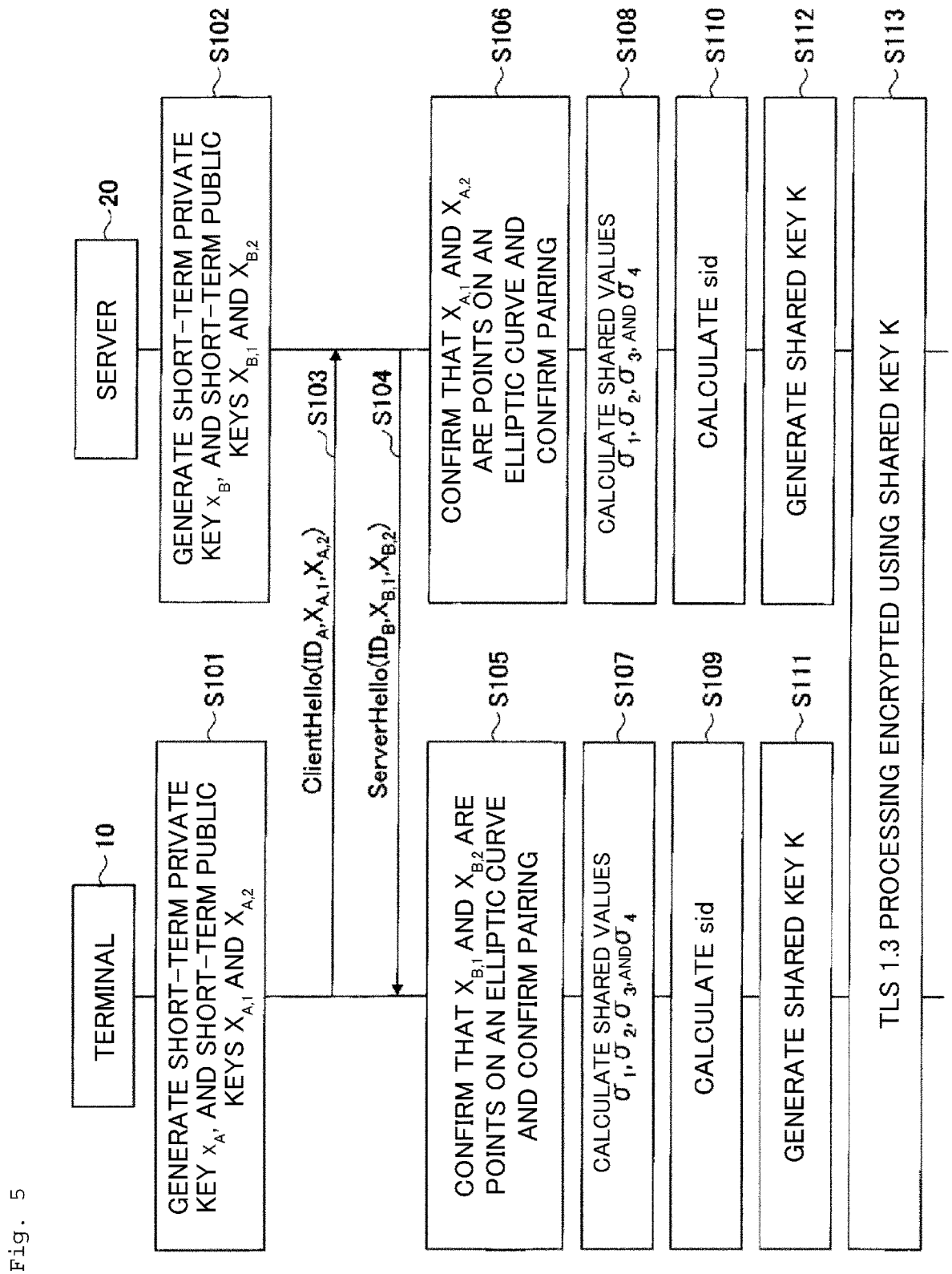
FIG. 5 is a sequence diagram showing an example of authentication processing in Working Example 1.

Hereinafter, Working Example 1 of the authentication processing performed using TLS 1.3 to which key exchange with mutual authentication using ID-based encryption is applied will be described with reference to FIG. 5. FIG. 5 is a sequence diagram showing an example of authentication processing in Working Example 1.

In Working Example 1, assume that the master private key of a key generation center is $z \in Z_q$, and the master public keys are $Z_1 = zg_1$ and $Z_2 = zg_2$; the user private key of the terminal 10 is $D_{A,1} = zQ_{A,1} = zH_1(ID_A) \in G_1$, and the user private key of the server 20 is $D_{B,2} = zQ_{B,2} = zH_2(ID_B) \in G_2$. Here, $H_1$ is a function that generates an element on $G_1$ from a character string, and $H_2$ is a function that generates an element on $G_2$ from a character string. $H_1$ and $H_2$ are public information. Note that the user private keys $D_{A,1}$ and $D_{B,2}$ are generated by the key generation center and are respectively distributed to the terminal 10 and the server 20 using any method.

The authentication processing unit 101 of the terminal 10 randomly selects a short-term private key $x_A \in Z_q$ and then generates short-term public keys $X_{A,1} = x_A g_1 \in G_1$ and $X_{A,2} = x_A g_2 \in G_2$ (step S101). Note that the short-term private key $x_A$ and the short-term public keys $X_{A,1}$ and $X_{A,2}$ are stored in the storage unit 102.

The authentication processing unit 201 of the server 20 randomly selects a short-term private key $x_B \in Z_q$ and then generates short-term public keys $X_{B,1} = x_B g_1 \in G_1$ and $X_{B,2} = x_B g_2 \in G_2$ (step S102). Note that the short-term private key $x_B$ and the short-term public keys $X_{B,1}$ and $X_{B,2}$ are stored in the storage unit 202.

Next, the authentication processing unit 101 of the terminal 10 transmits a ClientHello to the server 20 (step S103). At this time, the authentication processing unit 101 transmits a ClientHello including the identifier $ID_A$ of the terminal 10 and the short-term public keys $X_{A,1}$ and $X_{A,2}$ to the server 20. Here, the identifier $ID_A$ and the short-term public keys $X_{A,1}$ and $X_{A,2}$ can be stored in, for example, the extension area (Extension field) of the ClientHello.

Next, the authentication processing unit 201 of the server 20 transmits a ServerHello to the terminal 10 (step S104). At this time, the authentication processing unit 201 transmits a ServerHello including the identifier $ID_B$ of the server 20 and the short-term public keys $X_{B,1}$ and $X_{B,2}$ to the terminal 10. Here, the identifier $ID_B$ and the short-term public keys $X_{B,1}$ and $X_{B,2}$ can be stored in, for example, an extension area (Extension field) of the ServerHello.

The information needed for key exchange (i.e., the identifier of the communication partner and the short-term public key) is exchanged through the above steps S103 to S104. That is, the information needed for key exchange is exchanged in one round.

Next, the authentication processing unit 101 of the terminal 10 confirms that $X_{B,1}$ and $X_{B,2}$ are points on elliptic curves $E_1$ and $E_2$, respectively, and that $e(X_{B,1}, g_2) = e(g_1, X_{B,2})$ is satisfied (step S105).

Note that in step S105 above, if at least one of "$X_{B,1}$ is not a point on the elliptic curve $E_1$", "$X_{B,2}$ is not a point on the elliptic curve $E_2$", and "$e(X_{B,1}, g_2) \neq e(g_1, X_{B,2})$" is satisfied, the authentication processing is considered to have failed, and the processing is ended or restarted from step S101 above. Thereafter, it is assumed that it was confirmed that $X_{B,1}$ and $X_{B,2}$ are points on the elliptic curves $E_1$ and $E_2$, respectively, and that $e(X_{B,1}, g_2) = e(g_1, X_{B,2})$.

Similarly, the authentication processing unit 201 of the server 20 confirms that $X_{A,1}$ and $X_{A,2}$ are points on elliptic curves $E_1$ and $E_2$, respectively, and that $e(X_{A,1}, g_2) = e(g_1, X_{A,2})$ is satisfied (step S106).

In step S106 above, if at least one of "$X_{A,1}$ is not a point on the elliptic curve $E_1$", "$X_{A,2}$ is not a point on the elliptic curve $E_2$", and "$e(X_{A,1}, g_2) \neq e(g_1, X_{A,2})$" is satisfied, the authentication processing is considered to have failed, and the processing is ended or restarted from step S101 above. Thereafter, it is assumed that it was confirmed that $X_{A,1}$ and $X_{A,2}$ are points on the elliptic curves $E_1$ and $E_2$, respectively, and that $e(X_{A,1}, g_2) = e(g_1, X_{A,2})$ is satisfied.

Next, the authentication processing unit 101 of the terminal 10 calculates shared values $\sigma_1$, $\sigma_2$, $\sigma_3$, and $\sigma_4$ as follows (step S107).

$$\sigma_1 = e(D_{A,1}, Q_{B,2})$$

$$\sigma_2 = e(D_{A,1} + x_A Z_1, Q_{B,2} + X_{B,2})$$

$$\sigma_3 = x_A X_{B,1}$$

$$\sigma_4 = x_A X_{B,2}$$

Similarly, the authentication processing unit 201 of the server 20 calculates shared values $\sigma_1$, $\sigma_2$, $\sigma_3$, and $\sigma_4$ as follows (step S108).

$$\sigma_1 = e(Q_{A,1}, D_{B,2})$$

$$\sigma_2 = e(Q_{A,1} + X_{A,1}, D_{B,2} + x_B Z_2)$$

$$\sigma_3 = x_B X_{A,1}$$

$$\sigma_4 = x_B X_{A,2}$$

Next, the authentication processing unit 101 of the terminal 10 calculates an sid as follows (step S109). Note that "sid" means "session ID".

$$sid = (ID_A \| ID_B \| X_{A,1} \| X_{A,2} \| X_{B,1} \| X_{B,2})$$

Similarly, the authentication processing unit 201 of the server 20 calculates an sid as follows (step S110).

$$sid = (ID_A \| ID_B \| X_{A,1} \| X_{A,2} \| X_{B,1} \| X_{B,2})$$

Also, the authentication processing unit 101 of the terminal 10 calculates a shared key K as follows (step S111).

$$K = H(\sigma_1 \| \sigma_2 \| \sigma_3 \| \sigma_4 \| sid)$$

Note that the shared key K is stored in the storage unit 102.

Similarly, the authentication processing unit 201 of the server 20 calculates a shared key K as follows (step S112).

$$K = H(\sigma_1 \| \sigma_2 \| \sigma_3 \| \sigma_4 \| sid)$$

Note that the shared key K is stored in the storage unit 202.

As a result, the terminal 10 and the server 20 can perform TLS 1.3 processing by encrypting subsequent messages (that is, messages after the ClientHello and ServerHello) using the shared key K (step S113).

Authentication Processing (Working Example 2)

Figure 6:
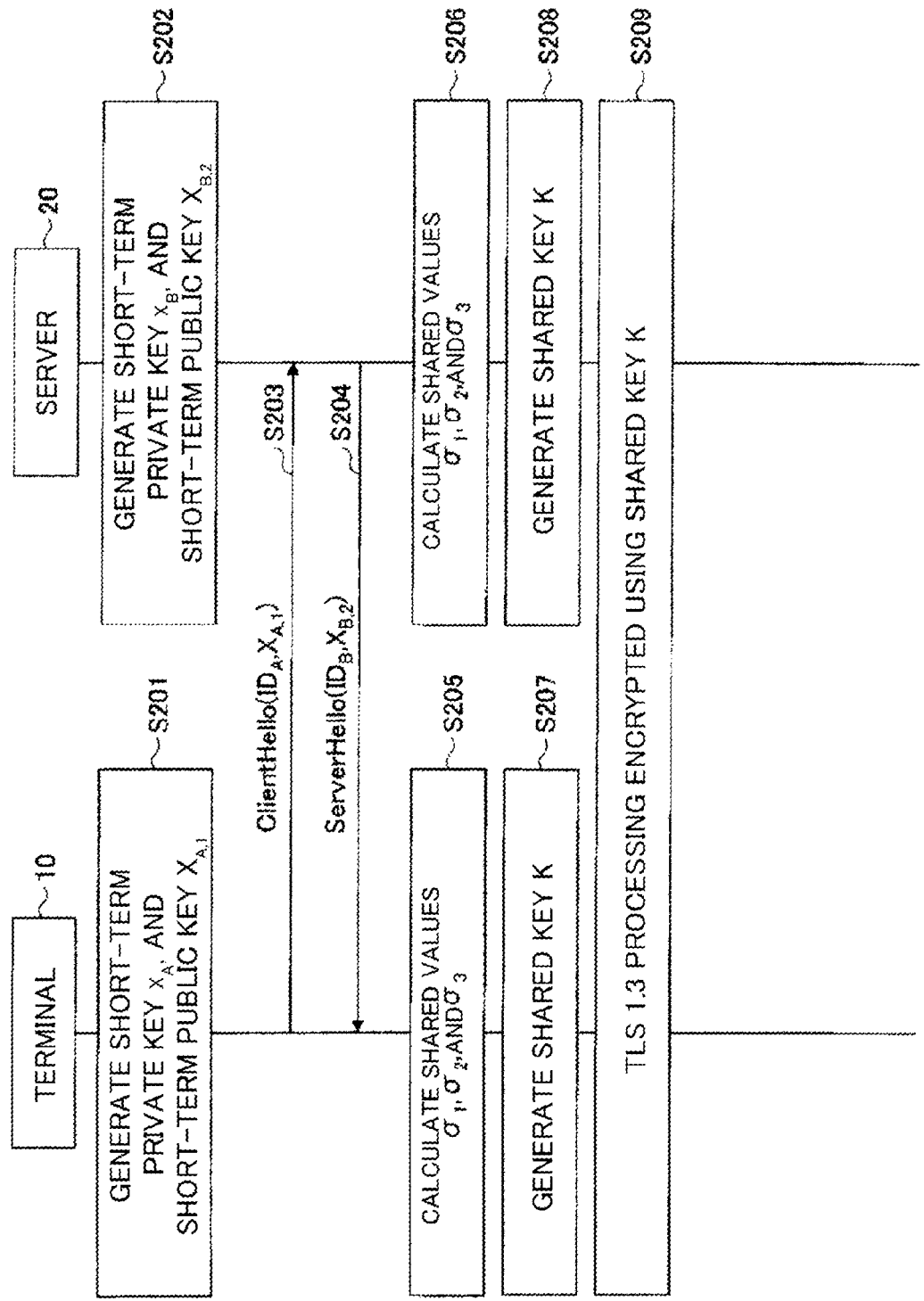
FIG. 6 is a sequence diagram showing an example of authentication processing in Working Example 2.

Hereinafter, Working Example 2 of the authentication processing performed using TLS 1.3 to which the key exchange with mutual authentication using ID-based encryption is applied will be described with reference to FIG. 6. FIG. 6 is a sequence diagram showing an example of the authentication processing in Working Example 2.

In Working Example 2, assume that the master private keys of the key generation center are $y \in Z_q$ and $z \in Z_q$, and the master public keys are $Y_1 = yg_1$, $Y_2 = yg_2$, $Z_1 = zg_1$, and $Z_2 = zg_2$; the user private key of the terminal 10 is $D_{A,1} = zQ_{A,1} = zH_1(ID_A) \in G_1$, and the user private key of the server 20 is $D_{B,2} = zQ_{B,2} = zH_2(ID_B) \in G_2$. Here, $H_1$ is a function that generates an element on $G_1$ from a character string, and $H_2$ is a function that generates an element on $G_2$ from a character string. $H_1$ and $H_2$ are public information. Note that the user private keys $D_{A,1}$ and $D_{B,2}$ are generated by the key generation center and are respectively distributed to the terminal 10 and the server 20 using any method.

The authentication processing unit 101 of the terminal 10 randomly selects a short-term private key $x_A \in Z_q$ and then generates a short-term public key $X_{A,1} = x_A g_1 \in G_1$ (step S201). The short-term private key $x_A$ and the short-term public key $X_{A,1}$ are stored in the storage unit 102.

The authentication processing unit 201 of the server 20 randomly selects a short-term private key $x_B \in Z_q$ and then generates a short-term public key $X_{B,2} = x_B g_2 \in G_2$ (step S202) Note that the short-term private key $x_B$ and the short-term public key $X_{B,2}$ are stored in the storage unit 202.

Next, the authentication processing unit 101 of the terminal 10 transmits a ClientHello to the server 20 (step S203). At this time, the authentication processing unit 101 transmits a ClientHello including the identifier $ID_A$ of the terminal 10 and the short-term public key $X_{A,1}$ to the server 20. Here, the identifier $ID_A$ and the short-term public key $X_{A,1}$ can be stored in the extension area (Extension field) of the ClientHello, for example.

Next, the authentication processing unit 201 of the server 20 transmits a ServerHello to the terminal 10 (step S204). At this time, the authentication processing unit 201 transmits a ServerHello including the identifier $ID_B$ of the server 20 and the short-term public key $X_{B,2}$ to the terminal 10. Here, the identifier $ID_B$ and the short-term public key $X_{B,2}$ can be stored in the extension area (Extension field) of the ServerHello, for example.

The information needed for key exchange (i.e., the identifier of the communication partner and the short-term public key) is exchanged through steps S203 and S204 described above. That is, the information needed for key exchange is exchanged in one round.

Next, the authentication processing unit 101 of the terminal 10 calculates shared values $\sigma_1$, $\sigma_2$, and $\sigma_3$ as follows (step S205).

$$\sigma_1 = e(D_{A,1}, Q_{B,2})$$

$$\sigma_2 = e(D_{A,1} + x_A Z_1, Q_{B,2} + X_{B,2})$$

$$\sigma_3 = e(Z_1 + x_A Y_1, X_{B,2})$$

Similarly, the authentication processing unit 201 of the server 20 calculates shared values $\sigma_1$, $\sigma_2$, and $\sigma_3$ as follows (step S206).

$$\sigma_1 = e(Q_{A,1}, D_{B,2})$$

$$\sigma_2 = e(Q_{A,1} + X_{A,1}, D_{B,2} + x_B Z_2)$$

$$\sigma_3 = e(X_{A,1}, Z_2 + x_B Y_2)$$

Then, the authentication processing unit 101 of the terminal 10 calculates a shared key K as follows (step S207).

$$K = H(\sigma_1, \sigma_2, \sigma_3, ID_A, ID_B, X_{A,1}, X_{B,2})$$

Note that the shared key K is stored in the storage unit 102.

Similarly, the authentication processing unit 201 of the server 20 calculates a shared key K as follows (step S208).

$$K = H(\sigma_1, \sigma_2, \sigma_3, ID_A, ID_B, X_{A,1}, X_{B,2})$$

Note that the shared key K is stored in the storage unit 202.

As a result, the terminal 10 and the server 20 can perform TLS 1.3 processing by encrypting subsequent messages (that is, messages after the ClientHello and ServerHello) using the shared key K (step S209).

Authentication Processing (Working Example 3)

Figure 7:
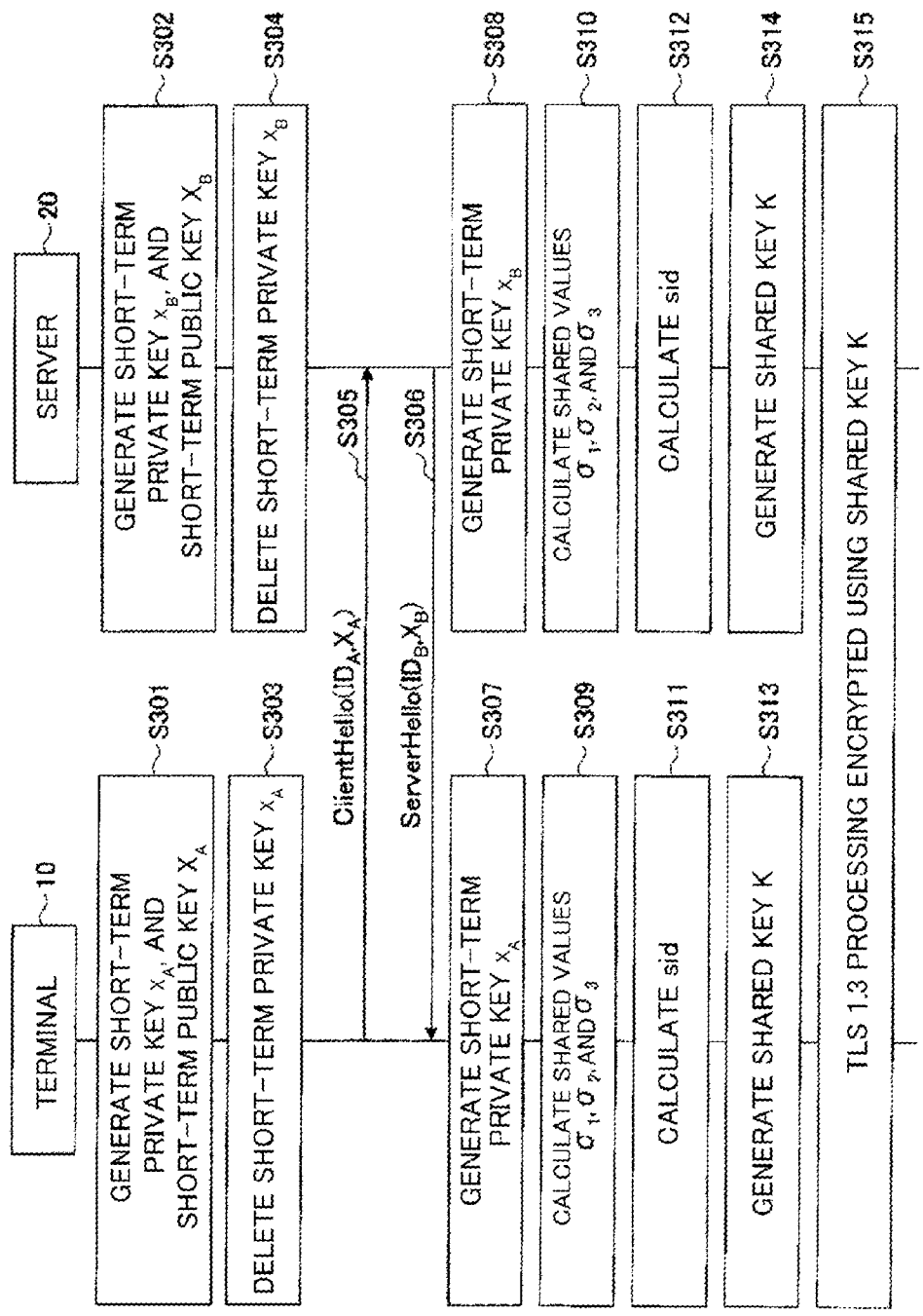
FIG. 7 is a sequence diagram showing an example of authentication processing in Working Example 3.

Hereinafter, Working Example 3 of the authentication processing performed using TLS 1.3 to which the key exchange with mutual authentication using ID-based encryption is applied will be described with reference to FIG. 7. FIG. 7 is a sequence diagram showing an example of the authentication processing in Working Example 3.

In Working Example 3, assume that the master private key of the key generation center is $z \in Z_q$, and the master public key is $Z = z g_1$; the user private key of the terminal 10 is $D_A = z Q_A = z H_3(ID_A) \in G_2$, and the user private key of the server 20 is $D_B = z Q_B = z H_3(ID_B) \in G_2$. Here, $H_3$ is a function that generates an element on $G_2$ from a character string, and is public information. The user private keys $D_A$ and $D_B$ are generated by the key generation center and are respectively distributed to the terminal 10 and the server 20 using any method.

The authentication processing unit 101 of the terminal 10 randomly selects $r_A \in Z_q$, generates a short-term private key $X_A = H_4(D_A \| r_A)$, and generates a short-term public key $X_A = x_A g_1 \in G_1$ (step S301). Here, $H_4$ is a function that generates an element on $Z_q$ from a character string, and is public information. Note that the short-term private key $x_A$ and the short-term public key $X_A$ are stored in the storage unit 102.

The authentication processing unit 201 of the server 20 randomly selects $r_B \in Z_q$, generates a short-term private key $x_B = H_4(D_B \; r_B)$, and generates a short-term public key $X_B = x_B g_1 \in G_1$ (step S302). Note that the short-term private key $x_B$ and the short-term public key $X_B$ are stored in the storage unit 202.

Next, the authentication processing unit 101 of the terminal 10 deletes the short-term private key $x_A$ from the storage unit 102 (step S303). Similarly, the authentication processing unit 201 of the server 20 deletes the short-term private key $x_B$ from the storage unit 202 (step S304).

The short-term private key $x_A$ is deleted from the storage unit 102 in step S303 above, but this is for preventing a situation in which the short-term private key $x_A$ leaks in the period before the identifier $ID_B$ and the short-term public key $X_B$ are received from the server 20. Similarly, the short-term private key $x_B$ is deleted from the storage unit 202 in step S304 above in order to prevent a situation in which the short-term private key $x_B$ is leaked before the identifier $ID_A$ and the short-term public key $X_A$ are received from the terminal 10.

Next, the authentication processing unit 101 of the terminal 10 transmits a ClientHello to the server 20 (step S305). At this time, the authentication processing unit 101 transmits a ClientHello including the identifier $ID_A$ of the terminal 10 and the short-term public key $X_A$ to the server 20. Here, the identifier $ID_A$ and the short-term public key $X_A$ can be stored in the extension area (Extension field) of the ClientHello, for example.

Next, the authentication processing unit 201 of the server 20 transmits the ServerHello to the terminal 10 (step S306). At this time, the authentication processing unit 201 transmits a ServerHello including the identifier $ID_B$ of the server 20 and the short-term public key $X_B$ to the terminal 10. Here, the identifier $ID_B$ and the short-term public key $X_B$ can be stored in the extension area (Extension field) of the ServerHello, for example.

The information needed for key exchange (that is, the identifier of the communication partner and the short-term public key) is exchanged in steps S305 and S306 described above. That is, the information needed for key exchange is exchanged in one round.

Subsequently, the authentication processing unit 101 of the terminal 10 regenerates the short-term private key $x_A = H_4(D_A \| r_A)$ (step S307). Note that the short-term private key $x_A$ is stored in the storage unit 102.

Similarly, the authentication processing unit 201 of the server 20 regenerates the short-term private key $x_B = H_4(D_B \| r_B)$ (step S308). Note that the short-term private key $x_B$ is stored in the storage unit 202.

Next, the authentication processing unit 101 of the terminal 10 calculates shared values $\sigma_1$, $\sigma_2$, and $\sigma_3$ as follows (step S309).

$$\sigma_1 = e(X_B, D_A)$$

$$\sigma_2 = e(x_A Z, Q_B)$$

$$\sigma_3 = x_A X_B$$

Similarly, the authentication processing unit 201 of the server 20 calculates shared values $\sigma_1$, $\sigma_2$, and $\sigma_3$ as follows (step S310).

$$\sigma_1 = e(x_B Z, Q_A)$$

$$\sigma_2 = e(X_A, D_B)$$

$$\sigma_3 = x_B X_A$$

Next, the authentication processing unit 101 of the terminal 10 calculates an sid as follows (step S311).

$$sid = (ID_A \| ID_B \| X_A \| X_B)$$

Similarly, the authentication processing unit 201 of the server 20 calculates an sid as follows (step S312).

$$sid = (ID_A \| ID_B \| X_A \| X_B)$$

Then, the authentication processing unit 101 of the terminal 10 calculates a shared key K as follows (step S313).

$$K = H(\sigma_1 \| \sigma_2 \| \sigma_3 \| sid)$$

Note that the shared key K is stored in the storage unit 102.

Similarly, the authentication processing unit 201 of the server 20 calculates a shared key K as follows (step S314).

$$K = H(\sigma_1 \| \sigma_2 \| \sigma_3 \| sid)$$

Note that the shared key K is stored in the storage unit 202.

As a result, the terminal 10 and the server 20 can perform TLS 1.3 processing by encrypting subsequent messages (that is, messages after the ClientHello and ServerHello) using the shared key K (step S315).

Evaluation

Finally, evaluation of the authentication processing (authentication processing performed using TLS 1.3 to which key exchange with mutual authentication using ID-based encryption is applied) executed by the authentication system 1 according to the present embodiment will be described. As an example, the authentication processing described in Working Example 3 above was compared with conventional TLS. TLS 1.3-X25519-Ed25519, which has a relatively small amount of communication among existing encryption suites, was adopted as a target of comparison.

Table 1 below shows the results of observing the packet size of each message during the TLS handshake, and the total. Note that in Table 1, the data size of the identifier used for ID-based encryption is 20 bytes. Table 1 also lists the packet size of each message in TLS 1.3-P256-RSA and the total for reference.

TABLE 1

|  | TLS1.3-P256-RSA (Reference) | TLS1.3-X25519-Ed25519 | Working Example 3 |
| --- | --- | --- | --- |
| ClientHello | 226 | 193 | 280 |
| ServerHello | 182 | 149 | 236 |
| EncryptedExtensions | 82 | 82 | 82 |
| CertificateRequest | 97 | 97 | — |
| Certificate$^{(s)}$ | 1275 | 687 | — |
| CertificateVerify$^{(s)}$ | 340 | 148 | — |
| Finished$^{(s)}$ | 112 | 112 | 112 |
| Certificate$^{(c)}$ | 1319 | 693 | — |
| CertificateVerify$^{(c)}$ | 340 | 148 | — |
| Finished$^{(c)}$ | 112 | 112 | 112 |
| Total | 4085 | 2421 | 822 |

$^{(s)}$Server-side transmitted message
$^{(c)}$Terminal-side transmitted message As shown in Table 1 above, it can be understood that Working Example 3 can reduce the amount of communication to about 34% compared to TLS 1.3-X25519-Ed25519. For this reason, it can be understood that Working Example 3 is effective also in the case where TLS is used in, for example, RoLaWAN, Sigfox, and the like, which are communication standards for IoT devices.

The present invention is not limited to the above-described embodiments that are specifically disclosed, and various modifications and changes can be made without departing from the description of the claims.

REFERENCE SIGNS LIST

1 Authentication system
10 Terminal
20 Server
101 Authentication processing unit
102 Storage unit
201 Authentication processing unit
202 Storage unit
N Communication network

The invention claimed is:

1. A terminal for performing authentication through TLS 1.3 with a server connected via a communication network, the terminal comprising:
  a memory; and
  a processor configured to execute
  transmitting, to the server, a ClientHello message including a first identifier and a first short-term public key, which are needed to generate a shared key for encrypting a message during a handshake in the TLS 1.3, through key exchange with mutual authentication using ID-based encryption;
  receiving, from the server, a ServerHello message including a second identifier and a second short-term public key, which are needed to generate the shared key; and
  generating the shared key using the first identifier, the first short-term public key, the second identifier, and the second short-term public key.

2. The terminal according to claim 1,
  wherein the first identifier is identification information for identifying the terminal, and the second identifier is identification information for identifying the server, and the first short-term public key is generated based on a first short-term private key generated by the terminal and a generator of a subgroup on an elliptic curve, and the second short-term public key is generated based on a second short-term private key generated by the server and a generator of a subgroup on an elliptic curve.

3. A server for performing authentication through TLS 1.3 with a terminal connected via a communication network, the server comprising:

a memory; and a processor configured to execute receiving, from the terminal, a ClientHello message including a first identifier and a first short-term public key, which are needed to generate a shared key for encrypting a message during a handshake in the TLS 1.3, through key exchange with mutual authentication using ID-based encryption;

transmitting, to the terminal, a ServerHello message including a second identifier and a second short-term public key, which are needed to generate the shared key; and generating the shared key using the first identifier, the first short-term public key, the second identifier, and the second short-term public key.

4. The server according to claim 3, wherein the first identifier is identification information for identifying the terminal, and the second identifier is identification information for identifying the server, and the first short-term public key is generated based on a first short-term private key generated by the terminal and a generator of a subgroup on an elliptic curve, and the second short-term public key is generated based on a second short-term private key generated by the server and a generator of a subgroup on an elliptic curve.

5. A method to be executed by a terminal including a memory and a processor for performing authentication through TLS 1.3 with a server connected via a communication network, the method comprising:

transmitting, to the server, a ClientHello message including a first identifier and a first short-term public key, which are needed to generate a shared key for encrypting a message during a handshake in the TLS 1.3, through key exchange with mutual authentication using ID-based encryption;

receiving, from the server, a ServerHello message including a second identifier and a second short-term public key, which are needed to generate the shared key; and generating the shared key using the first identifier, the first short-term public key, the second identifier, and the second short-term public key.

6. A non-transitory computer-readable recording medium having computer-readable instructions stored thereon, which when executed, cause a computer including a memory and a processor to execute processing as the terminal according to claim 1.

* * * * *